United States Patent
Stevens et al.

(10) Patent No.: US 12,189,278 B2
(45) Date of Patent: Jan. 7, 2025

(54) SYSTEM FOR HOLDING OBJECTS AT THE FRONT OF A CAMERA LENS

(71) Applicant: Lensbaby, Inc., Portland, OR (US)

(72) Inventors: Andrew B. Stevens, Portland, OR (US); Craig C. Strong, Portland, OR (US)

(73) Assignee: LENSBABY, INC., Portland, OR (US)

( * ) Notice: Subject to any disclaimer, the term of this patent is extended or adjusted under 35 U.S.C. 154(b) by 0 days.

(21) Appl. No.: 18/228,588

(22) Filed: Jul. 31, 2023

(65) Prior Publication Data
US 2023/0375905 A1 Nov. 23, 2023

Related U.S. Application Data

(63) Continuation of application No. 16/905,795, filed on Jun. 18, 2020, now abandoned.
(Continued)

(51) Int. Cl.
*G03B 17/56* (2021.01)
*F16B 1/00* (2006.01)
(Continued)

(52) U.S. Cl.
CPC .............. *G03B 17/566* (2013.01); *F16B 1/00* (2013.01); *F16C 11/04* (2013.01); *F16C 11/06* (2013.01);
(Continued)

(58) Field of Classification Search
CPC .......... G03B 17/566; F16B 1/00; F16C 11/06; F16M 13/022
See application file for complete search history.

(56) References Cited

U.S. PATENT DOCUMENTS

| 5,208,624 | A |   | 5/1993 | MacKay |
| 5,550,610 | A | * | 8/1996 | DeMarco ............... G03B 11/00 396/545 |

(Continued)

FOREIGN PATENT DOCUMENTS

| DE | 202013104541 U1 | 10/2013 |
| DE | 102013205700 | 5/2018 |

(Continued)

OTHER PUBLICATIONS

Cokin, web page: https://en.wikipedia.org/wiki/Cokin, 1 page, Aug. 27, 2018, retrieved from Internet Archive Wayback Machine, http://web.archive.org/web/20190620174957/https://en.wikipedia.org/wiki/Cokin, on Nov. 13, 2020.
(Continued)

*Primary Examiner* — Minh Q Phan
(74) *Attorney, Agent, or Firm* — Miller Nash LLP

(57) ABSTRACT

A system for holding objects at the front of a camera lens includes a mount and positionable objects for creating photographic effects. The system includes a magnetically receptive surface that receives one or more effect wands in a magnetic ball-socket relationship. The strength of the magnetic ball-socket is sized according to the size and weight of effect wands used by the photographer to place such wands in the light path of the camera lens to achieve a desired effect. Extension arms may also be integrated between a mounting ring base and the effect wands providing additional flexibility. Related methods are also disclosed.

16 Claims, 7 Drawing Sheets

Related U.S. Application Data

(60) Provisional application No. 62/862,704, filed on Jun. 18, 2019.

(51) Int. Cl.
*F16C 11/04* (2006.01)
*F16C 11/06* (2006.01)
*F16M 13/02* (2006.01)

(52) U.S. Cl.
CPC ....... *F16M 13/022* (2013.01); *F16B 2200/83* (2023.08); *F16M 2200/06* (2013.01)

(56) References Cited

U.S. PATENT DOCUMENTS

| | | |
|---|---|---|
| 7,194,200 B1 | 3/2007 | Behlow |
| 8,620,152 B1 | 12/2013 | Martin |
| 9,939,714 B1 | 4/2018 | Matthews |
| 2005/0225959 A1 | 10/2005 | Pohlert et al. |
| 2007/0024826 A1 | 2/2007 | Gilbert et al. |
| 2010/0067130 A1 | 3/2010 | Kim et al. |
| 2015/0198865 A1 | 7/2015 | Chang et al. |

FOREIGN PATENT DOCUMENTS

| | | |
|---|---|---|
| JP | H10274799 A | 10/1998 |
| JP | 2000065288 A | 3/2000 |
| JP | 2001249373 A | 9/2001 |
| JP | 2003050421 A | 2/2003 |
| JP | 2005010315 A | 1/2005 |
| JP | 2018005124 A | 1/2018 |
| KR | 100718241 B1 | 5/2007 |
| KR | 101584737 B1 | 1/2016 |

OTHER PUBLICATIONS

Extended European Search Report issued in European Patent Application No. 20827885.3, mailed Jun. 1, 2023, 9 pages.
PCT International Search Report and Written Opinion issued in International Application No. PCT/US2020/038545, mailed Oct. 6, 2020, 13 pages.
Pop-Tech, "Mobile Phone Car Mount, Pop-Tech Universal Magnetic Cell Phone Dashboard Car Mount Holder for Apple iPhone iPod Samsung Galaxy LG HTC Nokia MOTO, Android Smartphone, GPS, Sticks on Any Flat Surface," web page: http://www.pop-tech.com/proShow.php?proID=22, 2 pages, Aug. 14, 2018, retrieved from Internet Archive Wayback Machine, https://web.archive.org/web/20180814203813/http://www.pop-tech.com/proShow.php?proID=22, on Nov. 16, 2020.
Puertas, Edu, "Manfrotto Magic Arm solves it," YouTube, Uploaded Apr. 21, 2018, https://www.youtube.com/watch?v=HRi3tUb_0_w, 58 pages.
Tropic Colour, "What Is PrismLensFx?" Vimeo, uploaded Jan. 11, 2019, https://vimeo.com/310779968, 14 pages.

* cited by examiner

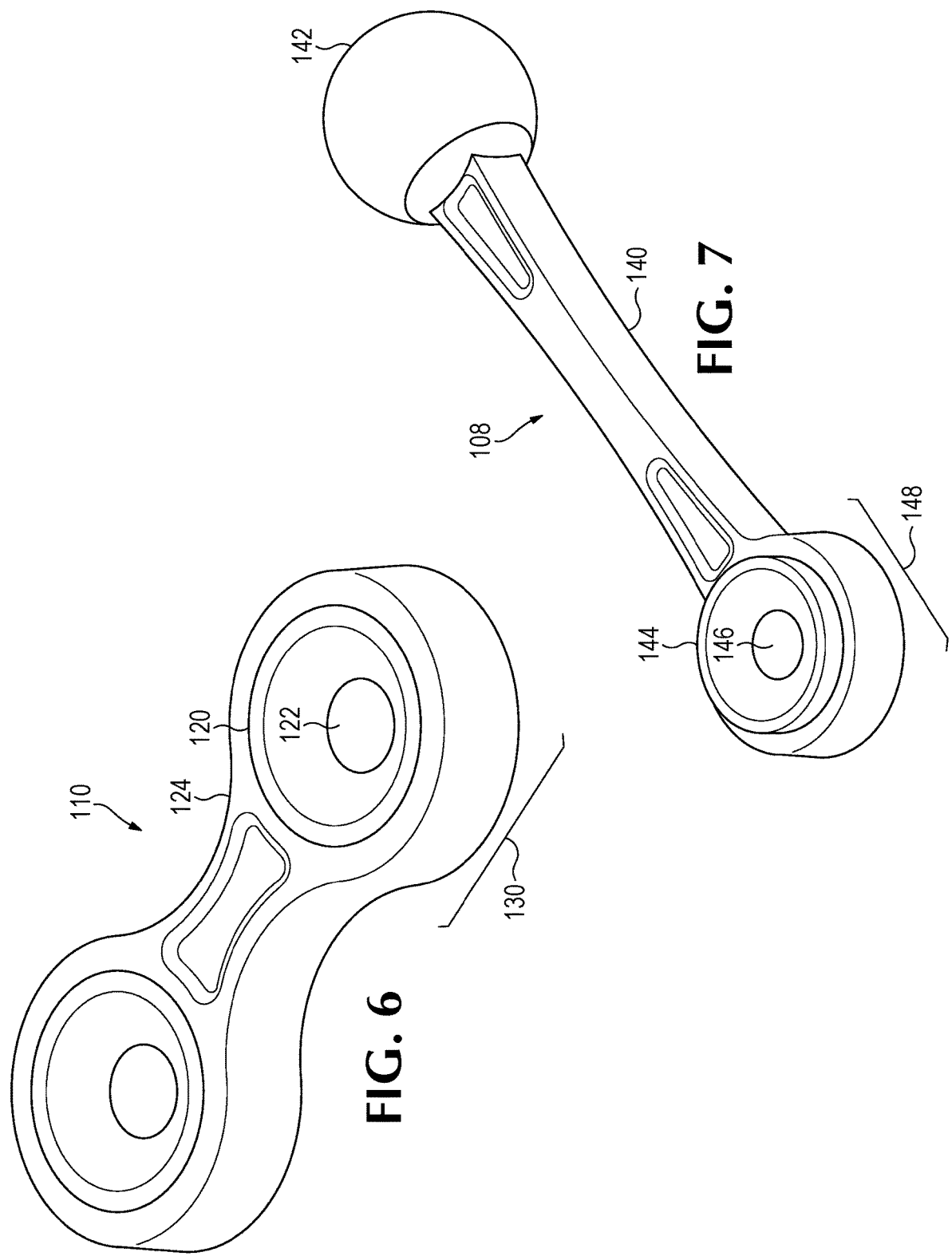

SYSTEM FOR HOLDING OBJECTS AT THE FRONT OF A CAMERA LENS

CROSS REFERENCE TO RELATED APPLICATIONS

This application is a continuation of co-pending U.S. patent application Ser. No. 16/905,795, titled "SYSTEM FOR HOLDING OBJECTS AT THE FRONT OF A CAMERA LENS," filed Jun. 18, 2020, which claims benefit from U.S. Provisional Application No. 62/862,704, titled "SYSTEM FOR HOLDING OBJECTS AT THE FRONT OF A CAMERA LENS," filed Jun. 18, 2019, the disclosures of both of which are incorporated herein by reference in their entirety.

FIELD OF THE INVENTION

This disclosure is directed to a mounting system, and, more particularly, to a mounting system for holding various objects at the front of a camera lens.

BACKGROUND

Photographic cameras with built-in or interchangeable lenses can often benefit by the use of lens filters that, when placed in the light path between the camera lens and the subject, achieve a desired visual effect that can be added to some and, when removed, excluded from other still or moving images.

Conventional lens filters are known and commonplace, and they come in many sizes to fit the front of most cameras and lenses. In general, light passes through a conventional lens filter before it enters the camera lens, where the light is refracted, or bent to show a representation of the subject that incorporates the effect or effects added by the filter to the photograph or moving image. These filters often cover the entirety of the front of a lens and apply its effect to the entirety of the final still or moving image. Conventional round filters are limited to, at most, circumferential or rotational adjustment or one degree of freedom, which may limit a photographer's artistic expression when one or more regions of a filter contain unique elements that are intended to be moved throughout the image.

Other filter solutions, such as manually holding a filtering element have proven to have limited flexibility and extendibility. Further, other complex systems that clamp to the camera and may include a filter frame or a bendable arm to hold a filter element are known, but tend to be highly complex, and are also relatively large and heavy, which reduces photographer usability.

Accordingly, there are shortcomings with conventional systems. Embodiments of the disclosed subject matter address these and other issues in the prior art.

BRIEF DESCRIPTION OF THE DRAWINGS

Embodiments of the present disclosure are illustrated as examples and are not limited by the figures of the accompanying drawings, in which like references may indicate similar elements and in which:

FIG. 6 is an isometric view of a yoke assembly that may be used with the system of FIG. 1, according to embodiments.

FIG. 7 is an isometric view of an arm assembly that may be used with the system of FIG. 1, according to embodiments.

DETAILED DESCRIPTION

Embodiments of the invention (sometimes referred to herein as the "system") are directed to modify and/or add light entering a camera lens while capturing photographic still or moving images by placing light sources, transparent, translucent, and/or opaque objects in front of and around the image making lens.

Complex foreground elements in an image, including both naturally present and introduced objects, can provide a sense of depth to images that otherwise might appear flat or ordinary.

When a foreground consisting of real and/or introduced elements in a scene is close enough to the camera lens and that lens has a shallow enough depth of field to obscure the details of the foreground, the natural and introduced foreground elements can be made to create a unique and compelling look not possible when these foreground elements are absent or when those elements are far enough from the front of the lens that their shape and identity is obvious to the viewer. Embodiments of the invention allow the photographer such creative control of the artistic image.

Figure 1:
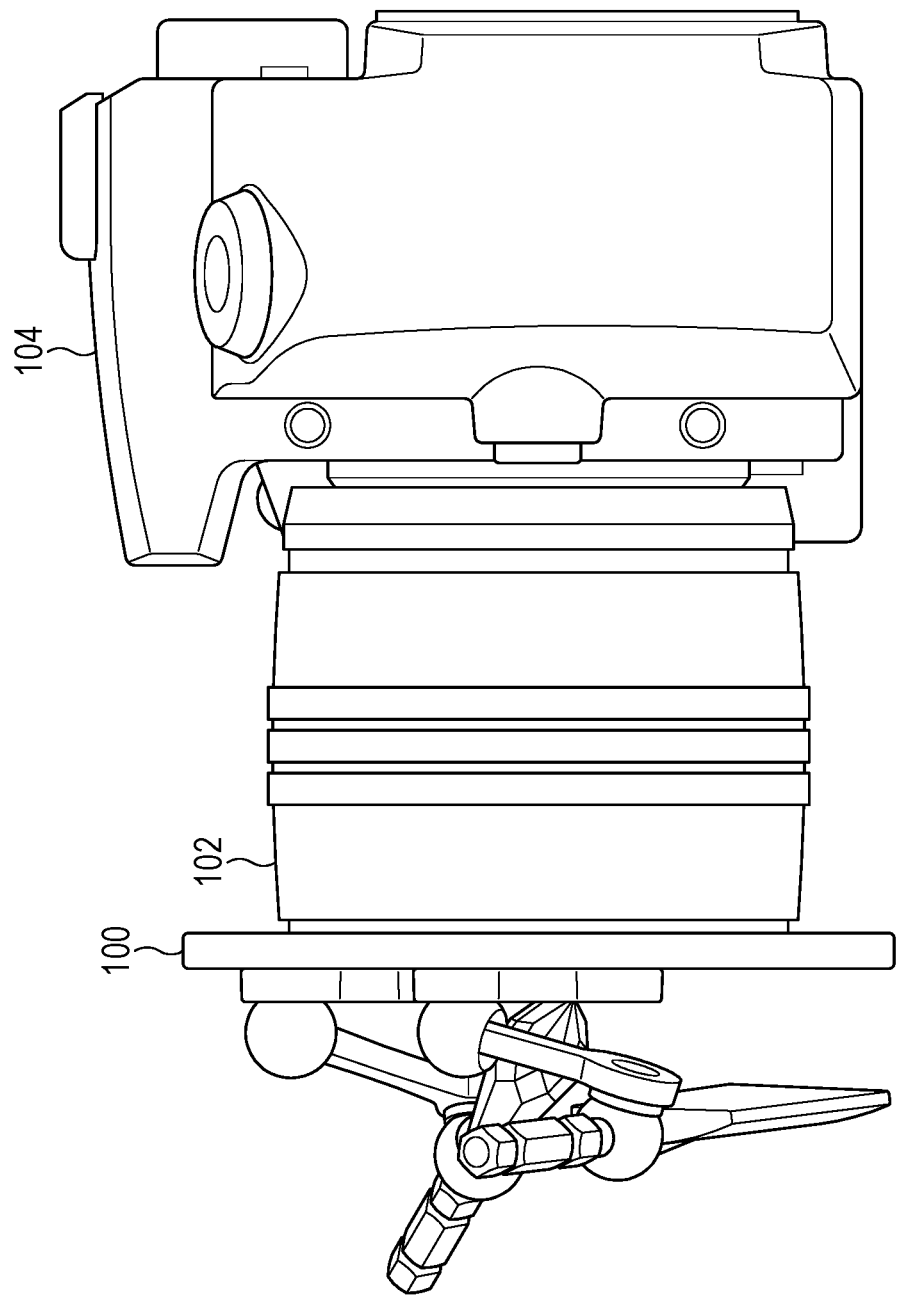
FIG. 1 is a side view of a system for holding objects at the front of a camera lens according to embodiments of the disclosure.
Figure 2:
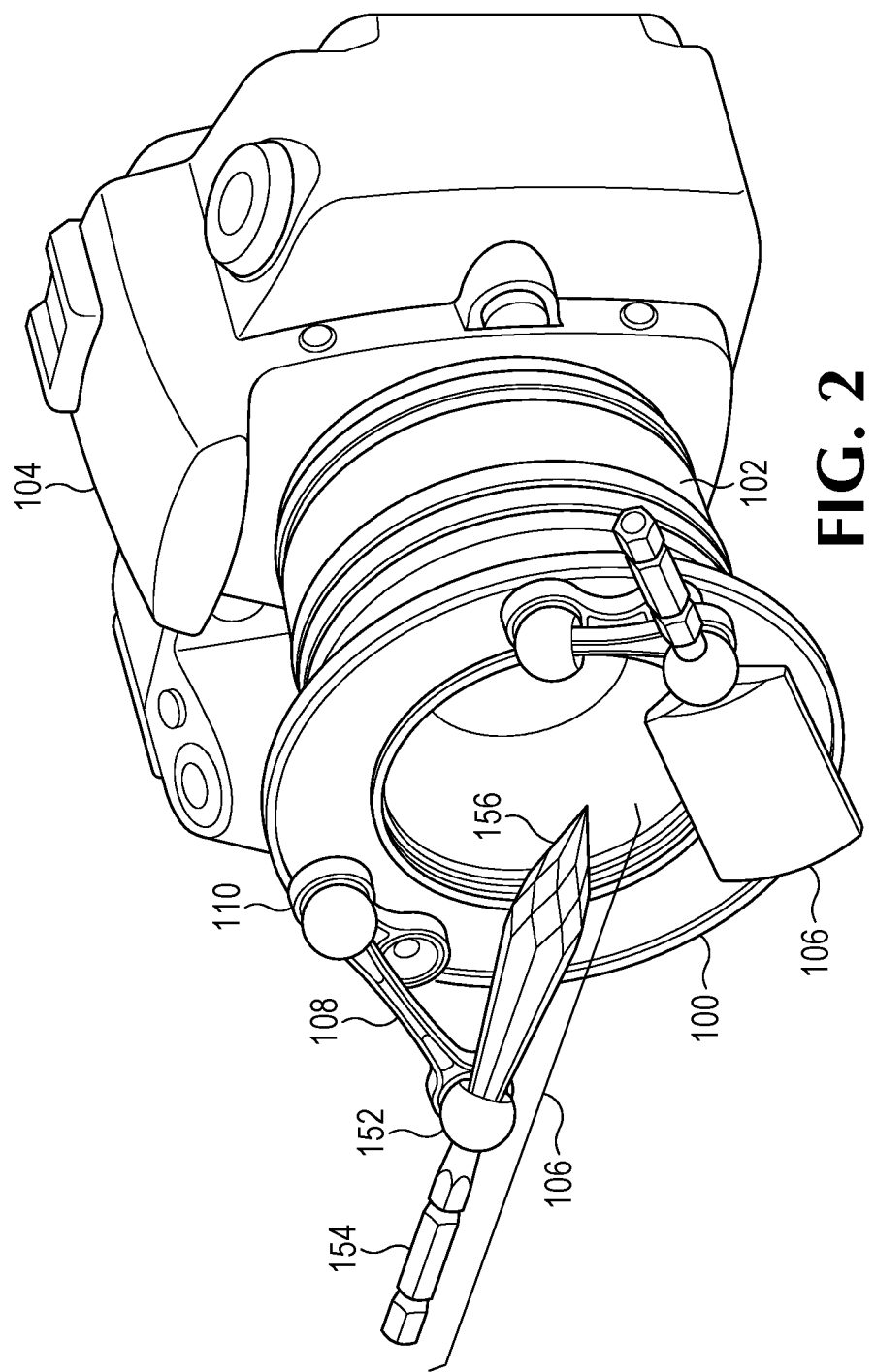
FIG. 2 is an isometric view of the system of FIG. 1.

FIG. 1 is a side view of a system for holding objects at the front of a camera lens according to embodiments of the disclosure. FIG. 2 is an isometric view of the system illustrated in FIG. 1. With reference to FIGS. 1 and 2, a mounting base or mounting 100 is coupled to the front of a camera lens 102 on the front of a camera 104. The mounting ring 100 functions as a base to support one or more effect wands 106 that may be positioned in front of the camera lens 102. Although the mounting ring 100 illustrated in these Figures is shown as round or annular, the mounting ring 100 can take any shape, such as square, rectangular, oval, etc., but is merely referred to herein as the mounting ring 100 for convenience. As described below, the wands 106 are structured to modify the light as it comes into the camera lens, creating visual effects that can be controlled by the photographer. Also as described below, the wands 106 remain in place after being positioned by the photographer, so the desired effect created by the photographer is repeatable.

In the illustrated embodiments, the wands 106 may be manually placed and positioned by the photographer, or someone working with the photographer, and are held in place by relatively strong magnets. As best seen in FIG. 2, the wands 106 include a magnetic spherical portion 152 that seats in a magnetic socket portion of an arm 108, which in turn has its own spherical portion that sits within a socket portion of a yoke 110. The yoke 110 is magnetically held or otherwise secured to the base 100. Each of the magnetic ball-socket interfaces in the system allows movement at the interface. For instance, the magnetic spherical portion 152 of the wand 106 is moveable and positionable relative to the socket portion of the arm 108. In addition, the magnetic spherical portion of the arm 108 is moveable and positionable relative to the socket portion of the yoke 110. In operation, the magnetic ball-socket interface of the wand 106 and arm 108 allows the photographer to move the wand 106 into nearly any position relative to the camera lens 102. And, once the photographer releases the wand 106, the magnetic action of the magnetic ball-socket interface is strong enough to keep the wand in the position set by the photographer. The magnetic ball-socket interface between the arm 108 and the yoke 110 operates similarly. Thus, the photographer has nearly complete control of where and how to orient one or more effect wands 106 within the light path in front of the camera lens 102, because the photographer can position the wand wherever desired, and it will remain in place after the photographer has placed it.

Figure 3:
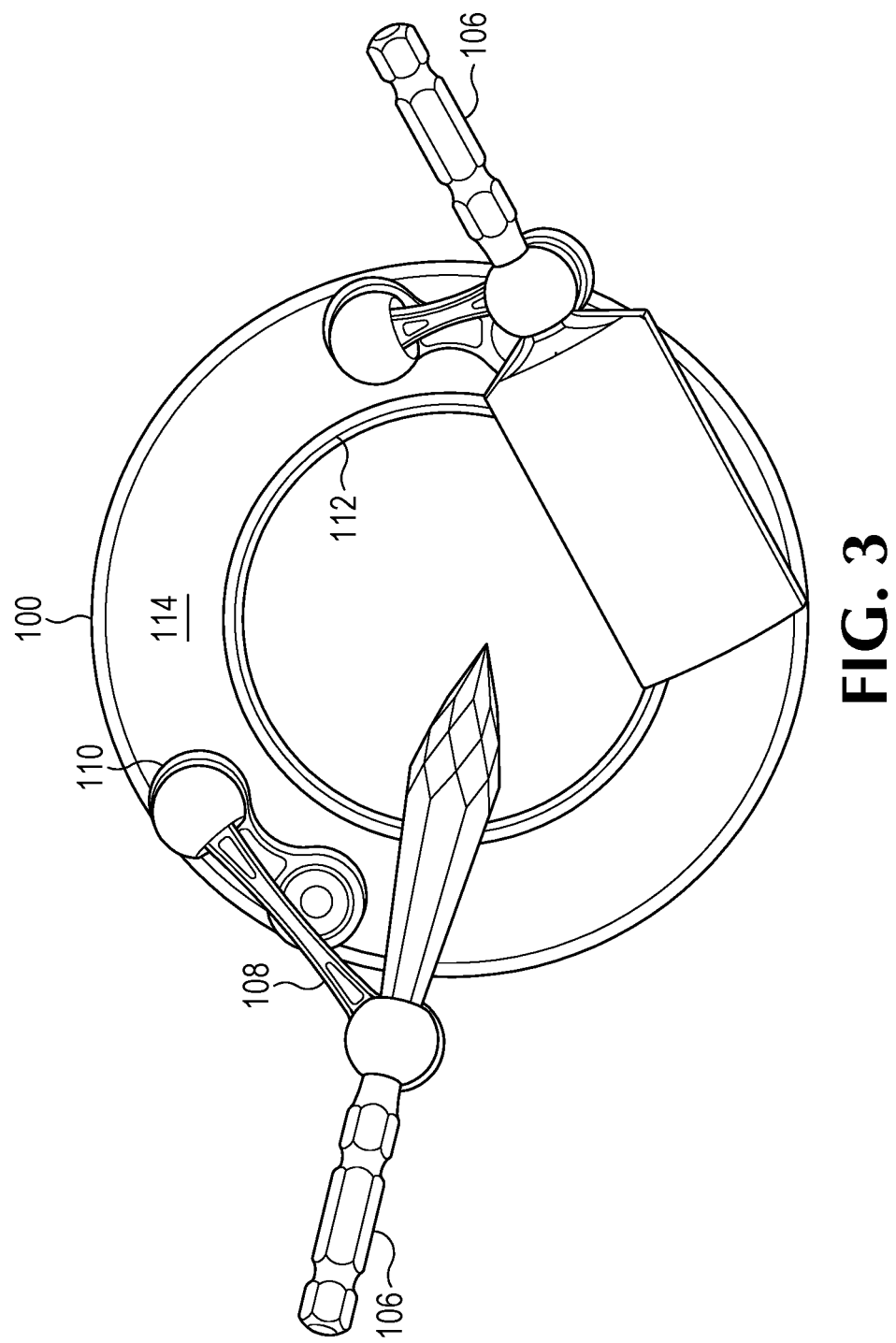
FIG. 3 is a front view of a mounting base, yoke assemblies, arm assemblies, and effect wands that may be used with the system of FIG. 1, according to embodiments.
Figure 4:
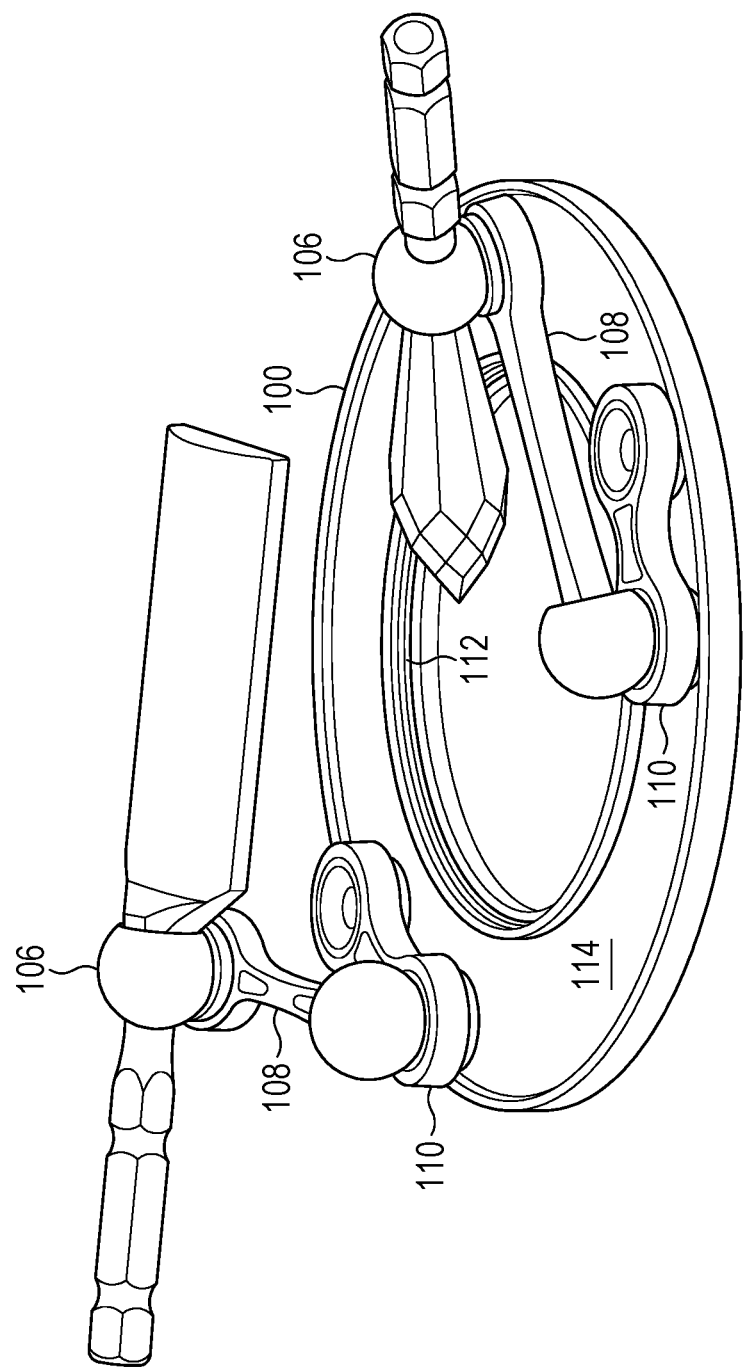
FIG. 4 is an angled isometric view illustrating detail of the mounting ring and other features of the system of FIG. 3, according to embodiments.
Figure 5:
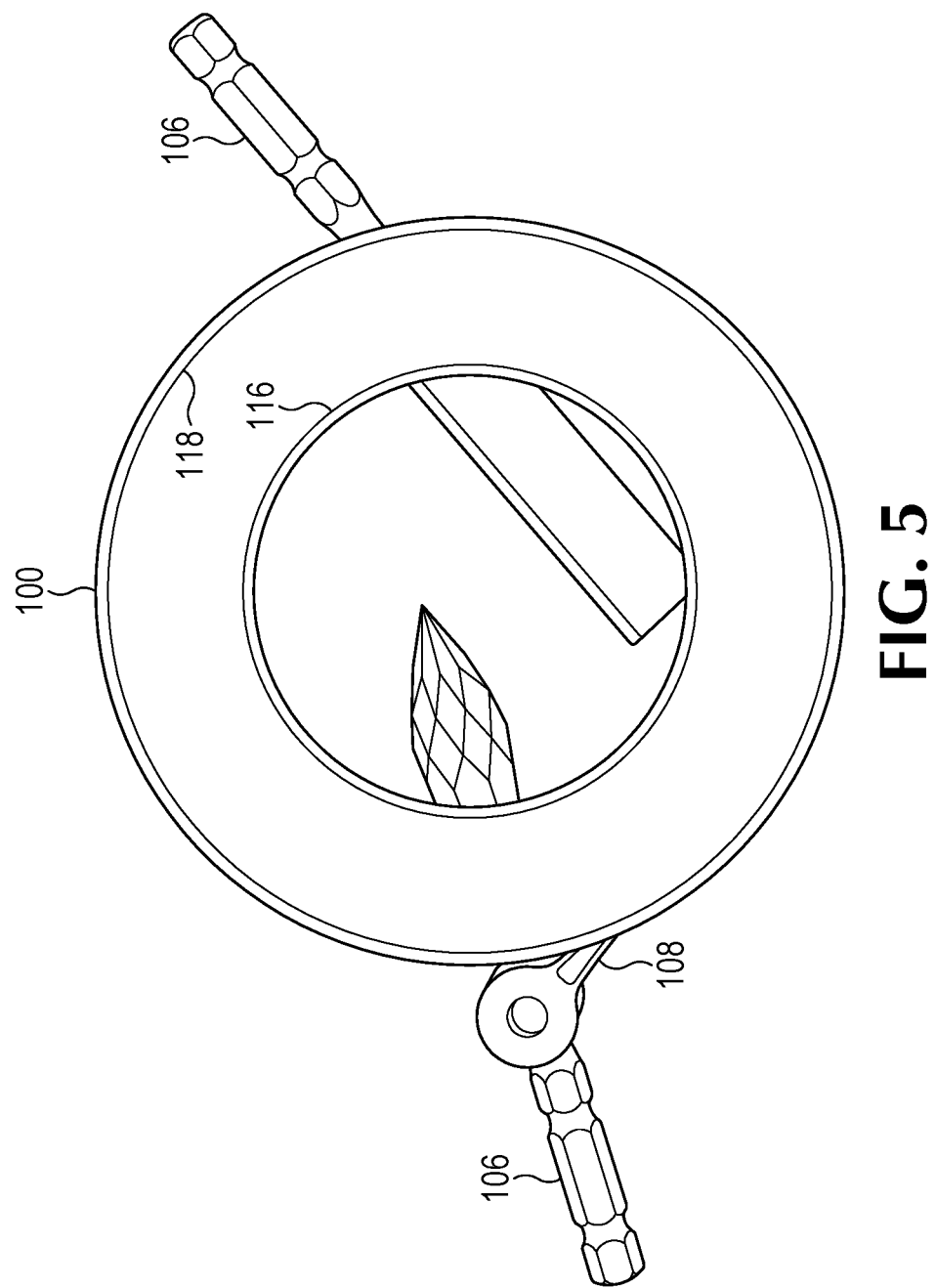
FIG. 5 is a rear view illustrating detail of the mounting ring and other features of the system of FIG. 3, according to embodiments.

FIGS. 3, 4, and 5 illustrate the mounting ring 100, yoke assemblies 110, arm assemblies 108, and effect wands 106 that may be used with the system of FIG. 1, according to embodiments. In the illustrated embodiments, the mounting ring 100 is mounted to the camera lens 102 (FIG. 1) through mating filter threads 116 on the back side of the mounting ring 100 (FIG. 5) and the standard filter threads on the camera lens (not illustrated). In some embodiments, the mounting ring 100 may additionally include a threaded front portion 112 (FIG. 3) to receive one or more standard filters. In this way the mounting ring 100 preserves the option to use standard filters even though the mounting ring 100 is mounted to the standard filter threads of the camera lens through its own threads 116.

One or more standard filter adaptor rings may be used to couple the mounting ring 100 to the camera lens 102 if the mounting threads 116 of the mounting ring 100 have a size different than the size of the filter threads of the camera lens. In some embodiments, the mounting ring 100 may be manufactured in any size to fit any sized filter threads of a camera lens 102. In other embodiments, the mounting ring 100 is manufactured in a limited number of sizes and standard filter adaptor rings are used to adapt any camera lens 102 to one of the standard sizes of the mounting rings 100. In operation, an adaptor ring is first coupled to the filter threads of the camera lens 102 and then the mounting threads 116 of the mounting ring 100 are coupled to the outer edge of the adaptor, which also includes threads. When the threads of the mounting ring and adaptors, if any, are tightened, the mounting ring 100 is firmly held to the camera lens 102 to supply a firm base for the remainder of the system. Some embodiments of the mounting ring 100 may allow the ring to be rotated relative to the camera lens 102, while still being firmly mounted to the camera lens. Such an embodiment may include a sliding or bearing surface between the mounting threads 116 of the mounting ring 100 and the mounting ring itself.

In other embodiments, the mounting ring 100 may be affixed to the front of the camera using other attaching methods, such as strapping or clamping the mounting ring 100 to the body of the camera, for instance. In other embodiments, the mounting ring 100 may include a bracket that mounts to a standard tripod socket located on the bottom of most cameras. In such an embodiment, a thumbscrew or other fastener could be used to attach the bracket of the mounting ring 100 to the camera such that the mounting ring is positioned near the front of the camera lens. Yet other embodiments could include a bracket that mounts to a hot or cold shoe (i.e., a flash mount), while still positioning the mounting ring 100 near the front of the camera lens. Still other possibilities of mounting the mounting ring or mounting base to the camera or camera lens could include a rail mount, Bayonet mount, and mechanical mounting, such as with screws and/or bolts.

The mounting ring 100 may be made of metal or other rigid material. In some embodiments the mounting ring 100 is either manufactured from a magnetic material, such as steel, or includes a magnetic surface coupled to the base material. The mounting ring 100 may be powder coated for durability and appearance. In the illustrated embodiment, the mounting ring 100 includes a recessed front ring 114 taking up the majority of the face of the mounting ring 100. The front ring 114 is recessed relative to an inner and outer lip, as illustrated in FIG. 4. The inner lip may be formed of the threaded portion 112 of the mounting ring 100, while the outer lip 118 may be structured as a base or other structure to act as a mechanical mounts to which arm assemblies or other accessories may be attached.

The front ring 114 of the mounting ring 100 is sized and structured to accept one or more yoke assemblies 110 attached at its front surface. Between the inner and outer edges of the front ring mounting ring 100, the recessed magnetically receptive front ring 114 maintains a track for the yoke assembly 110, keeping the yoke assembly securely mounted to the mounting ring 100 even when the yoke assembly is slid around the front of the mounting ring while repositioning the yoke assembly and thus adjusting the position of the effect wand 106 mounted on the yoke assembly 110.

As illustrated in FIG. 6, in some embodiments, the yoke assembly 110 include a yoke frame 124 and two magnetic sockets 130. Each socket 130 may include a chamfered magnet 120 and a magnet plug 122 together forming a somewhat spherically recessed shape structured to receive a magnetic ball. Using a magnet plug 122 in concert with a magnet 120 makes a particularly strong magnetic receiver. In some embodiments the magnet 120 and the magnet plugs are each 6 mm in size, although other sizes, such as smaller or larger sizes may be used. Larger sized magnetic ball and socket joints may require too much force to comfortably manually move the wands 106 and arms 108, while smaller sized magnetic ball and socket joints may not have enough magnetic force to retain the wands and arms in place.

Each yoke assembly 110 may be magnetically coupled to the front ring 114 of the mounting ring. Magnetic force to keep the yoke assembly coupled to the front ring 114 may come from the magnet 120 and magnet plug 122, or may come from another magnet (not shown) attached to the yoke assembly 110. Preferably, each yoke assembly 110 includes two or more magnetic sockets 130, spaced apart from one another. Including at least two magnetic sockets 130 per assembly 110 spaced apart from one another ensures that the magnets 120 do not rotate freely, as would be the case if an assembly 110 only contained one magnetic socket 130. Instead, including two magnetic sockets 130 per assembly 110 allows the photographer to move the effect wands freely while the assembly 110 stays securely magnetically attached to the front ring 114 of the mounting ring 100.

The front ring 114 of the mounting ring 100 is sized to accept one or more yoke assemblies 110. The width of the track of the front ring 114 may be selected to accommodate movement of the yoke assemblies 110. In other words, the width of the track of the front ring may be large enough to give the photographer choice in positioning the yoke assemblies 110 on the mounting ring. In other embodiments, the width of the track may be sized just large enough to accept one or more yoke assemblies 110 with limited movement ability. In yet other embodiments, the mounting ring 100 may be completely filled with an entire ring of 10-20 magnetic sockets (not illustrated). In such an embodiment, the system would not include separate assemblies 110, but rather the arms 108 or wands 106 could attach directly to one of the permanently mounted sockets on the mounting ring 100.

In addition to attaching magnetically, in some embodiments the yoke assembly 110 may attach to the mounting ring 100 using temporary or permanent adhesives or mechanical fasteners.

With reference to FIG. 7, the arm assembly 108 may be used in conjunction with a yoke assembly 110. The illustrated arm assembly 108 includes a frame 140, a magnetic spherical portion 142, and a magnetic socket portion 148. Similar to the yoke assemblies 110 of FIG. 6, the magnetic socket portion 148 of the arm assembly 108 includes a small hollow cylindrical magnet 144 and a small magnet plug 146. In some embodiments the magnet 144 and plug 146 of the arm assembly 108 are sized the same as the magnet 120 and plug 120 of the yoke assembly 110. The length of the frame 130 of the arm assembly 108 may be implementation specific. Further, a set of components in the system of FIG. 1 may include multiple arm assemblies 108 having different lengths, which provides the photographer additional flexibility.

In operation, the magnetic spherical portion 148 of the arm assembly is inserted into one of the magnetic socket portions 130 of the yoke assembly 110. Then, the wand 106, and specifically the magnetic spherical portion 152 of the wand 106 is inserted into the magnetic socket portion 148 of the arm assembly 108. This combination with two separate magnetic ball-socket joints (one at the junction of the yoke assembly 110 with the arm assembly 108, and one at the junction of the arm assembly 108 and the wand 106, as illustrated in FIGS. 1 and 2) provides the photographer a large amount of freedom in positioning the various effect wands relative to the camera lens 102. Also, since each yoke assembly 110 includes at least two magnetic socket portions 130, this allows each yoke assembly 110 to support two separate effect wands 106, each of which is separately positionable by the photographer. Further, the wands 106 may be positioned over or partially over one another to combine the effects of the wands 106. Yet further, each additional yoke assembly 110 supports an additional two wands 106, and there is space for many yoke assemblies 110 to be placed on the mounting ring 100. A photographer, therefore, has a large amount of artistic control by selecting and positioning an almost unlimited combination of effect wands, each having its effect on the light entering a camera lens 102, effectively giving the photographer complete control as to how to compose her image.

Although the embodiment described above is a magnetic ball-socket articulating joint structure, other articulating joint structures may be used in other embodiments. For example, one such articulating joint structure can be formed of any mechanically articulating joints, such as a friction joint or ratchet joint between two separate pieces that allow the effect wands 106 to be moved into place, and then retain their place after being positioned. Further, what is described as an articulating joint structure may not, in fact, be an articulating structure at all, but could be formed of a single piece of material that may be manipulated to place the effect wand 106 in a position where it remains after being positioned. For example, the arms or other structures that couple to the effect wands 106 could be formed of a bendable or pliable material, such as metal wire, or metal wire coated in plastic or other material, which retains its position after being moved.

Figure 8:
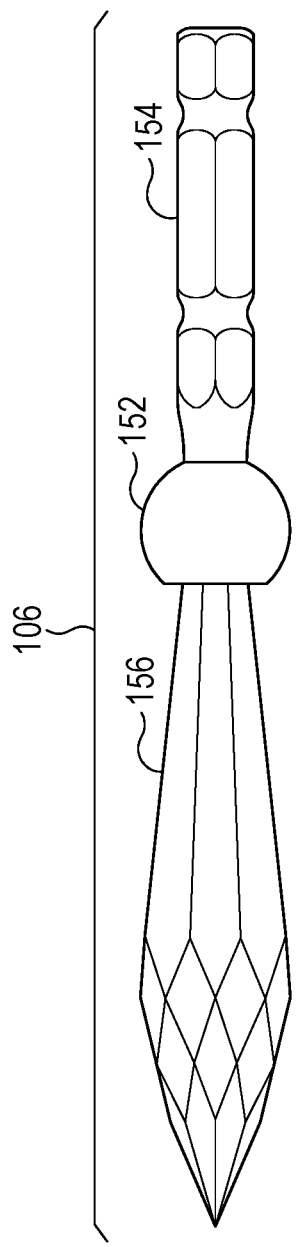
FIG. 8 is a top view of an example effect wand that may be used with the system of FIG. 1, according to embodiments.

FIG. 8 is a top view of an effect wand 106 that may be used with the system of FIG. 1, according to embodiments. As described above, the effect wand 106 may include a magnetic spherical portion 152 located between a handle 154 and an effect portion 156. The effect portion 156 of a wand 106 is generally used to modify light from a subject as it enters the camera lens 102. In many embodiments the effect portion 156 is made from crystal, glass, or plastic, each of which having various effects on the resulting image. The effect portion 156 may be formed of different shapes as well, such as prism or partial prisms, round, or hemispherical, for instance. In some embodiments the effect portion 156 may be a film, such as a diffraction film clamped to the handle 154. In particular embodiments, the effect portion 156 of a wand may include one or more of the following: crystal spear, crystal seahorse, cylindrical lens, diffraction grating film, optical window with facets at edges, 40/60/80 degree triangle prism, equilateral triangle prism, optical window ring, mirrors or mirrored windows, rods or tubes, colored or patterned film, containers filled with liquids or amorphous solids, transparent liquid crystal display.

In other embodiments, the effect portion 156 of the wand 106 may include various shapes that are opaque to the light entering the camera lens 102. By moving such opaque wands 106 the photographer can create shade, shadows, occlusions and other effects based on the controllable absence of light.

In yet other embodiments the effect wand 106 may include a light source in its effect portion 156. The light source may be battery powered or solar powered, for instance. In other instances the light source may be chemical-luminescent, such as glow sticks. In embodiments where the effect wand 106 includes a light source, the photographer is able to add sources of light in specific portions of the resulting image. By placing light sources on wands 106 that are easily moved and remain in position once so moved, the photographer is provided a great deal of creative control not previously available.

Although the embodiments described above used manual manipulation of the wands 106, in other embodiments, the handle 154 of the wand assembly 106 can be inserted into a motorized or mechanized accessory whereby the objects move at a user adjustable speed allowing circumferential, radial, pitch, yaw, roll, and distance movements from the photographic lens. In such an embodiment movements can be made to match a predetermined path as programmed by the user.

In some embodiments, the wand assembly 106 can take on motorized movement based on an accelerometer in a phone attached to the camera, giving the user the ability to send objects sweeping and rotating, among other possible actions, through an image in conjunction with the panning and raising and lowering of the camera taking the images.

In other embodiments, motorized movement of the effect wands 106 is determined by the camera taking the still or moving images with that camera communicating wired or wirelessly with the motors determining the action of the wand assemblies, bringing a natural or decidedly unnatural movement to the objects or lights being placed in front of the camera based on the movement of the camera.

Figure 9:
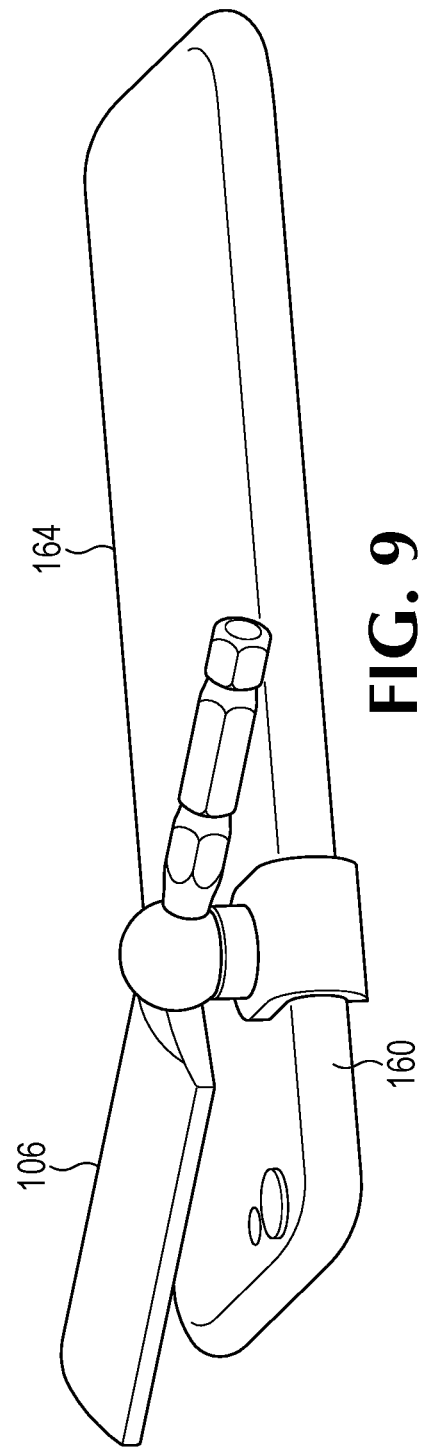
FIG. 9 is an angled isometric view illustrating a clamping system that may be used in a system for holding objects at the front of a camera lens according to embodiments of the disclosure.

With reference to FIG. 9, some disclosed embodiments further include a mounting mechanism 160 that has its own magnetic socket that is able to connect arms 108 and wands 106 to a camera and lens combination that lacks filter threads. The camera could be a stand-alone camera, such as a conventional film or digital point-and-shoot or single-lens reflex camera, or a camera integrated into another device, such as a mobile device, computer, or phone 164. This mounting mechanism, in various embodiments, could take the form of a clamp with a magnetic socket 130 similar to that used in the yoke assembly 110, could be integrated into a phone case, or utilize and existing lens mount in the form of a bayonet or screw mechanism initially intended to mount auxiliary lenses. In other embodiments, the mounting mechanism 160 could use other methods of attaching to a device to allow a wand 106 to be positioned in the light path of a camera lens, such as temporary or permanent adhesives, friction mounts, etc.

As described herein, embodiments of the invention are directed to a system for holding objects at the front of a camera lens. Elements of various described embodiments provide a magnetically based system that allows for circumferential adjustment, radial adjustment, pitch adjustment, yaw adjustment, roll adjustment, and distance from the photographic lens adjustment, and incorporates a mechanically tensioned ball and socket system with lens filter-thread mounted base, a clamped mounted base, and a rack mounted base. The above-described system allows artistic control to those using lenses with filter threads, lenses with no threads, and lenses that are part of a larger support system. All methods of mounting the system at the front of a cameras lens are contemplated. These mounting options provide additional artistic control for a user of a camera and lens, allowing the user to create repeatable images that cannot be created with currently available filter systems or through currently practiced methods employed to place objects in front of a camera lens.

Accordingly, at least some embodiments of a system for holding objects at the front of a camera lens include a magnetically receptive mounting ring and at least one magnet used to connect the magnetically receptive ring to various objects. The mounting ring that mounts on the camera also includes a portion that receives the magnets that hold objects around and in front of the camera lens.

In at least some embodiments of the system, magnets used to secure the objects to the magnetically receptive ring are cylindrical with an internal chamfer and a through hole in order to make contact with the maximum surface area and hold fast to a spherical magnetically receptive surface incorporated into the handle of objects and universal clips, allowing objects to be mounted onto the system and moved, while retaining their position when adjustment has been completed. Accordingly, to increase tension on the spherical magnetically receptive portion of the handle of objects and universal clips, these hollow chamfered cylindrical magnets may incorporate a magnetically receptive cylindrical plug that nearly fills the hollow portion of the magnet. These magnetically receptive cylindrical plugs push against the spherical surface of the handle as well as the cylindrical surface of extension arms and other accessories, increasing tension on the handle and other accessories, further ensuring that the objects stay secure when adjustment has been completed.

Based on the above-described examples and description, embodiments of the invention allow the attachment of objects, optics, lights, motors etc, in front of a camera lens by way of magnets, pins, bolts, clamps, or other mechanical means. In some embodiments an articulated mechanism mounted on the system is attached to the front of a camera lens to hold accessories in place and allow for the manipulation of effect-producing objects. These objects are securely mounted to, and removable from the articulated mechanism by magnetism, threads, clamp, adhesive, or other mechanical means.

Various embodiments of the disclosure provide for an articulated mechanism utilizing magnets, friction-fit ball and socket, ratcheting hinge, or other means or mechanism to allow for circumferential adjustment, radial adjustment, pitch adjustment, yaw adjustment, roll adjustment, and distance from the photographic lens adjustment of effect-producing objects.

Various embodiments allow for the attachment of traditional round or square filters to be used with or separately from other objects and/or articulated arms.

Various embodiments allow for the attachment of motors to move or rotate articulated arms, objects or light sources coupled to the effect-producing objects, wands, or articulating arms.

Various embodiments allow for the attachment of an illumination device to cast light on objects held in the system for the purpose of creating a different or more intense effect than when using objects not being illuminated. Alternatively, attached illumination devices may be used to illuminate the photographic subject.

Another application of an attached illumination device is to project light into the camera lens in order to create effects due to this additional light causing flare, ghosting and reduced contrast. Illumination devices mount to system with the option to utilize an articulated arm allowing manipulation of the position and direction of the light being produced.

This written description makes reference to particular features. It is to be understood that the disclosure in this specification includes all possible combinations of those particular features. For example, where a particular feature is disclosed in the context of a particular aspect or embodiment, that feature can also be used, to the extent possible, in the context of other aspects and embodiments.

Also, when reference is made in this application to a method having two or more defined steps or operations, the defined steps or operations can be carried out in any order or simultaneously, unless the context excludes those possibilities.

Furthermore, the term "comprises," "includes" and its grammatical equivalents are used in this application to mean that other components, features, steps, processes, operations, etc. are optionally present. For example, an article "comprising" or "which comprises" components A, B, and C can contain only components A, B, and C, or it can contain components A, B, and C along with one or more other components.

Although specific embodiments have been illustrated and described for purposes of illustration, it will be understood that various modifications may be made without departing from the spirit and scope of the disclosure.

What is claimed is:

1. A system for maintaining a position of objects in a light path of a camera lens, comprising:
   a metal mounting base having an inner circular opening with internal threads, the internal threads of the base structured to be screwed onto external threads of the camera lens to rigidly secure the mounting base to the camera lens;

an effect wand that modifies light when placed in the light path of the camera lens, the effect wand having a width less than an entire cross-sectional area of the camera lens; and an articulating joint structure disposed between the mounting base and the effect wand and structured to allow the effect wand to be movably positioned in the light path of the camera lens at an angle other than perpendicular to an optical axis of the camera lens.

2. The system for maintaining a position of objects in a light path of a camera lens according to claim 1, in which the articulated joint structure allows positional adjustment of the effect wand relative to the mounting base in two or more of the group consisting of circumferential adjustment, radial adjustment, pitch adjustment, yaw adjustment, roll adjustment, and distance from the camera lens.

3. The system for maintaining a position of objects in a light path of a camera lens according to claim 1, in which the effect wand maintains its position relative to the mounting base after being positioned.

4. The system for maintaining a position of objects in a light path of a camera lens according to claim 1, in which the articulating joint structure is structured to allow the effect wand to be manually positioned.

5. The system for maintaining a position of objects in a light path of a camera lens according to claim 1, in which the effect wand comprises a light source for casting light.

6. The system for maintaining a position of objects in a light path of a camera lens according to claim 5, in which the light source is structured to illuminate a photographic subject.

7. The system for maintaining a position of objects in a light path of a camera lens according to claim 5, in which the light source is structured to project light into the camera lens.

8. The system for maintaining a position of objects in a light path of a camera lens according to claim 1, in which the effect wand comprises crystal, liquid crystal, glass, metal, or plastic.

9. The system for maintaining a position of objects in a light path of a camera lens according to claim 1, in which the effect wand comprises diffraction grating film.

10. The system for maintaining a position of objects in a light path of a camera lens according to claim 1, in which the effect wand comprises colored gel.

11. The system for maintaining a position of objects in a light path of a camera lens according to claim 1, in which the articulating joint structure comprises a magnetic socket.

12. The system for maintaining a position of objects in a light path of a camera lens according to claim 1, in which the articulating joint structure comprises a pair of magnetic sockets structured to be magnetically coupled to the mounting base.

13. The system for maintaining a position of objects in a light path of a camera lens according to claim 11, in which the articulating joint structure comprises:

a yoke including a yoke magnetic socket coupled to the metal mounting base, and an arm assembly including a first spherical portion at a first end that is structured to be magnetically received into the yoke magnetic socket, the arm assembly further including an arm magnetic socket at a second end of the arm that is opposite the first end; and in which the effect wand comprises a spherical portion structured to be magnetically received into the arm magnetic socket.

14. The system for maintaining a position of objects in a light path of a camera lens according to claim 13, in which the articulating joint structure further comprises:

a second yoke magnetic socket coupled to the mounting base, and a second arm assembly including a first spherical portion at a first end of the second arm assembly that is structured to be magnetically received into the second yoke magnetic socket, the second arm assembly further including an arm magnetic socket at a second end of the second arm that is opposite the first end, in which the arm magnetic socket of the second arm assembly is structured to receive a spherical portion of a second effect wand.

15. A system for holding objects in a light path of a camera lens, comprising:

an annular-shaped, generally planar, metal mounting base having an inner circular opening with internal threads, the internal threads of the base structured to mate onto external threads of the camera lens to rigidly secure the mounting base to the camera lens;

an articulating joint structure having a magnet structured to magnetically couple the articulating joint structure to the mounting base, the articulating joint structure further having a magnetic receiver at a distal end thereof; and an effect wand that modifies light when placed in the light path of the camera lens, the effect wand having a width less than an entire cross-sectional area of the camera lens, and the effect wand having a metal ball shaped to be magnetically received by the magnetic receiver of the articulating joint structure.

16. The system for holding objects according to claim 15, in which the articulating joint structure is structured to allow the effect wand to be movably positioned in the light path of the camera lens at an angle other than perpendicular to an optical axis of the camera lens.

* * * * *